(12) United States Patent
Ochoa et al.

(10) Patent No.: US 7,648,319 B1
(45) Date of Patent: Jan. 19, 2010

(54) CLIP NUT FASTENER

(76) Inventors: Orlando Ochoa, 2755 Thompson Creek Rd., Pomona, CA (US) 91767; Mark Balderrama, 2755 Thompson Creek Rd., Pomona, CA (US) 91767

( * ) Notice: Subject to any disclaimer, the term of this patent is extended or adjusted under 35 U.S.C. 154(b) by 0 days.

(21) Appl. No.: 12/291,810

(22) Filed: Nov. 12, 2008

(51) Int. Cl.
*F16B 37/02* (2006.01)

(52) U.S. Cl. ...................................... 411/174; 411/112

(58) Field of Classification Search ............... 411/174, 411/103, 104, 112, 125
See application file for complete search history.

(56) References Cited

U.S. PATENT DOCUMENTS

| 2,394,729 | A | * | 2/1946 | Tinnerman | 411/112 |
| 5,193,643 | A | * | 3/1993 | McIntyre | 180/312 |
| 5,630,686 | A | * | 5/1997 | Billmann | 411/112 |
| 6,146,071 | A | * | 11/2000 | Norkus et al. | 411/104 |
| 6,474,917 | B2 | | 11/2002 | Gauron | 411/112 |
| 6,854,941 | B2 | | 2/2005 | Csik | 411/112 |
| 6,918,725 | B2 | | 7/2005 | Gauron | 411/112 |
| 7,189,043 | B2 | * | 3/2007 | Benoit et al. | 411/104 |
| 7,246,978 | B2 | * | 7/2007 | Morishima et al. | 411/104 |

* cited by examiner

*Primary Examiner*—Gary Estremsky
(74) *Attorney, Agent, or Firm*—David G. Duckworth; Russo & Duckworth, LLP

(57) ABSTRACT

A clip nut is provided including a clip body and nut. The clip body includes an upper arm connected to a lower arm by a connecting end wall. The clip body has a nut housing upon its upper arm for affixing a nut having a tubular body and a radially projecting base. The nut housing includes an end wall, an intermediate wall and a top wall. A ridge projects upwardly from the upper arm between the intermediate wall and end wall. Furthermore, the top wall includes an opening for allowing the nut's base to slide upon the ridge to enter a cavity during assembly. Thereafter, the nut is tilted forwardly and the nut's base is slid into a nut receiving chamber to complete the assembly of the clip nut.

4 Claims, 5 Drawing Sheets

CLIP NUT FASTENER

BACKGROUND OF THE INVENTION

The present invention relates to mounts and fasteners. More specifically, the present invention relates to lightweight clip nut fasteners which are particularly useful within the aircraft and automotive industries.

Many types of mounting devices have been developed for holding one or more objects to a support surface. For example, clip nuts are constructed to slide over the edge of a panel to position and maintain a nut for receiving a bolt or other threaded device. Clip nuts are known and used to mount items to the panel and for attaching two or more panels together. Common applications for clip nuts include use in automobiles, appliances and aircraft. For example, a single commercial aircraft may utilize hundreds of thousands of clip nuts.

Commonly used clip nuts are described in U.S. Pat. Nos. 6,474,917 and 6,918,725, both naming Gauron as the inventor. Each of these patents describe a clip nut having a clip body having first and second arms connected by an end wall. This U-shaped structure is constructed for receiving a panel between the first and second arms. Each arm includes a coaxially aligned hole for aligning with a hole within the panel. The clip nut includes a housing for holding the nut and maintaining the nut's central threaded bore coaxially aligned with the holes formed in the clip nut's upper and lower arms. To insert the nut into the housing, these patents describe a structure wherein the housing's sidewalls must be displaced to allow tabs on the nut to project through openings in the housing sidewalls. U.S. Pat. No. 6,854,941 describes a similar clip nut. However, to insert the nut into the clip nut housing, the housing includes a narrowed inlet through which the nut's tubular barrel is pushed through.

Although current clip nut constructions are generally effective, they do suffer from various drawbacks. Durability, load and torque capability are very important and certain clip nuts are insufficiently structured to undergo high loads and torque. Moreover, it would be desirable to provide a clip nut wherein the nut can be more readily inserted into a clip housing. In addition, clip nuts are commonly used in high volumes and any improvements in use or cost savings would be extremely advantageous.

Therefore, there is a need for an improved clip nut that provides high load and torque capabilities.

It would also be desirable to provide a clip nut that was cost effective to manufacture and employ.

Furthermore, it would be advantageous to provide an improved clip nut wherein the nut could more easily be inserted into a clip nut housing.

SUMMARY OF THE INVENTION

The present invention addresses the aforementioned disadvantages by providing an improved clip nut. The clip nut includes a traditional "U" shaped construction including an upper arm, a lower arm and a connecting wall for connecting the arms. The upper and lower arms are substantially parallel for receiving a panel between the arms. One end of the clip body, referred to herein as the proximal end of the clip nut's body, is closed by the connecting wall. Meanwhile, the other end of the clip body, referred to herein as the distal end of the clip body, is open for receiving a panel. Each of the arms includes a hole toward its distal end, with the holes coaxially aligned with one another for receipt of a threaded male fastener passing through the clip body's upper and lower arms.

The clip nut includes a nut which is mounted to the top of the clip body's upper arm. The nut has a traditional construction employed for clip nuts in that the nut has a base and a tubular body. The tubular body has an internally threaded central bore for receipt of a male fastener. Meanwhile, the base includes a pair of tabs which radially project from opposite sides of the nut's tubular body.

To affix the nut to the top of the clip body's upper arm, the clip nut includes a housing formed upon the clip body's upper arm. The nut housing includes an end wall which extends upwardly and laterally across the top of the clip body's upper arm at its distal extremity. The end wall is positioned distally of the hole formed through the clip body's upper arm. The nut housing further includes an intermediate end wall which extends laterally across the top of the clip body's upper arm. The intermediate end wall is located between the upper arm's proximal extremity and upper arm's distal extremity.

The nut housing includes a ridge which also extends upwardly from the top of the clip body's upper arm. The ridge is located between the nut housing's end wall and intermediate wall. In addition, the ridge extends laterally across the top of the upper arm and is positioned so that the upper arm's hole is substantially intermediate to the ridge and end wall. The nut housing's ridge includes a substantially vertical face which is substantially parallel to the end wall. In addition, the ridge includes a top surface which slopes downwardly and proximally from the top of the ridge's vertical face to merge with the clip body's upper arm.

The clip housing further includes a top wall which engages and extends from the end wall, over the ridge, to engage the intermediate wall. Of importance, the top wall extends over and is sufficiently spaced from the top of the ridge to provide a space sufficient so that the nut's base can slide under the top wall but over the ridge. The top wall includes an opening having a laterally extending slot sized to receive the nut's base so that the nut's base can enter the opening and slide over the ridge. In addition, the top wall's opening includes an oval channel which extends longitudinally with respect to the clip nut's body. This channel is sized to receive and allow longitudinal movement of the nut's tubular body.

The volume between the top wall, intermediate wall, and sloped top surface of the ridge form a "tear dropped" shaped cavity. Meanwhile, the volume between the ridge's face, end wall, upper arm and top wall form a nut receiving chamber for receiving the clip nut's nut.

To install the nut within the nut's housing, the nut's base is slid downwardly and proximally through the slot formed in the top wall. The nut's base is forcibly slid upon the ridge's top surface into the teardrop shaped cavity while the nut's tubular body enters the opening's oval channel. After the nut's base is positioned within the teardrop shaped cavity, the nut is tilted by causing the tubular body to move distally until the top of the nut's base is below the bottom surface of the top wall. The nut's base is then be slid into the nut receiving chamber causing the nut's tubular body to coaxially align with the upper arm and lower arm holes.

Advantageously, the nut is maintained in place by the nut housing. Vertical and lateral movement of the nut is restrained by the top wall. Longitudinal movement of the nut is restrained by the end wall and ridge. Moreover, the ridge and end wall restrict rotation and torque imparted by attempts to rotate the nut.

Also advantageously, the structural elements that inhibit longitudinal and rotational movement of the nut, namely the ridge and end wall, do not undergo significant deformation during assembly while the nut is introduced into the nut housing. Because deformation is not required, these elements can be stiffened to provide additional durability and load capability to the clip nut.

Other features and advantages of the invention will become apparent to those skilled in the art from the following detailed description taken in conjunction with the drawings.

DETAILED DESCRIPTION OF THE INVENTION

Figure 1:
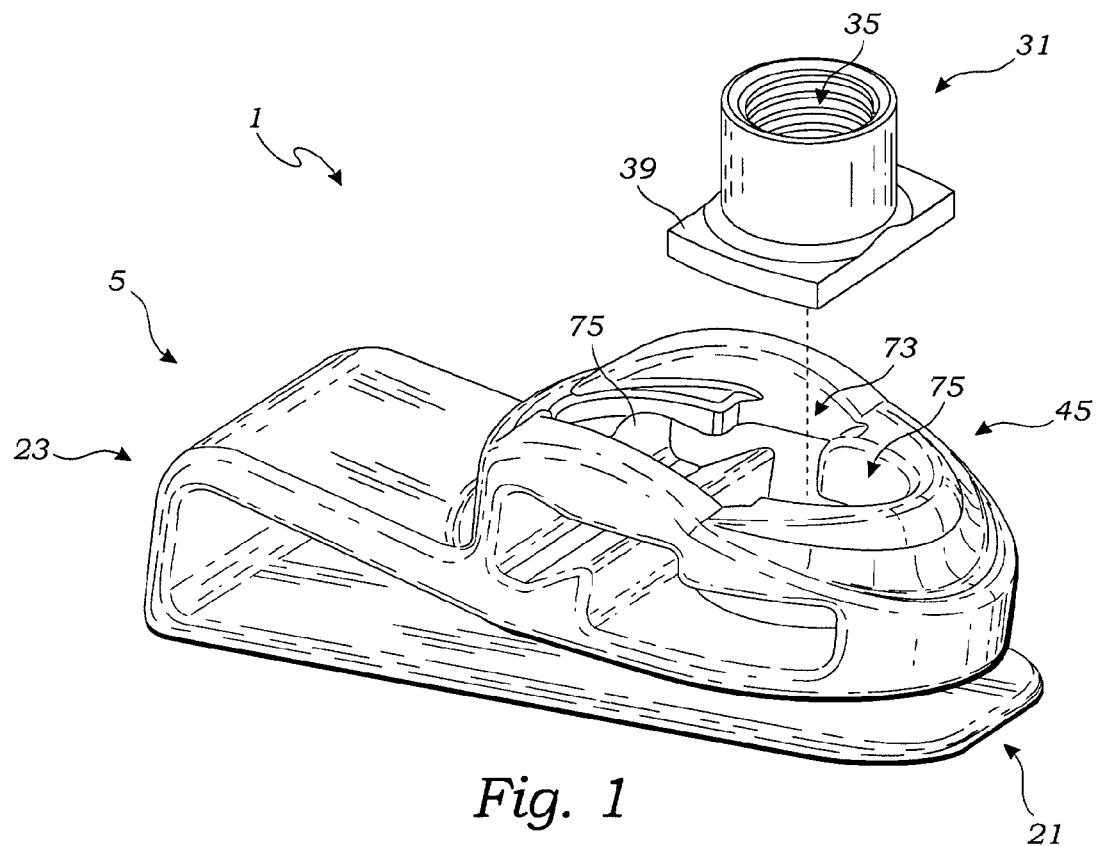
FIG. 1 is a perspective view illustrating the clip nut of the present invention with the nut removed.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

Figure 2:
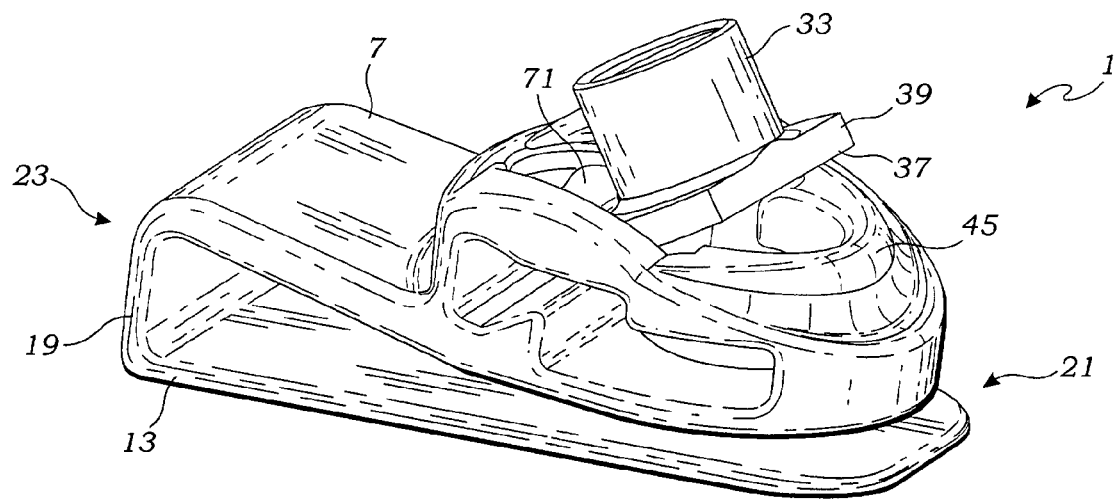
FIG. 2 is a perspective view of the clip nut of the present invention with the nut in the process of being installed into the clip nut.
Figure 3:
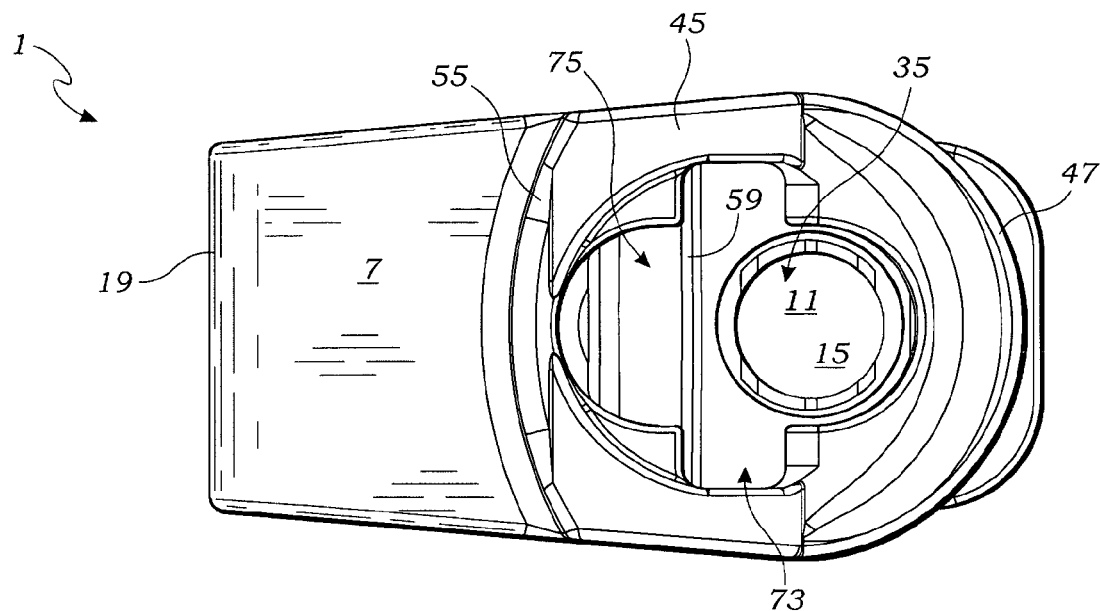
FIG. 3 is a top plan view of the clip nut of the present invention.
Figure 4:
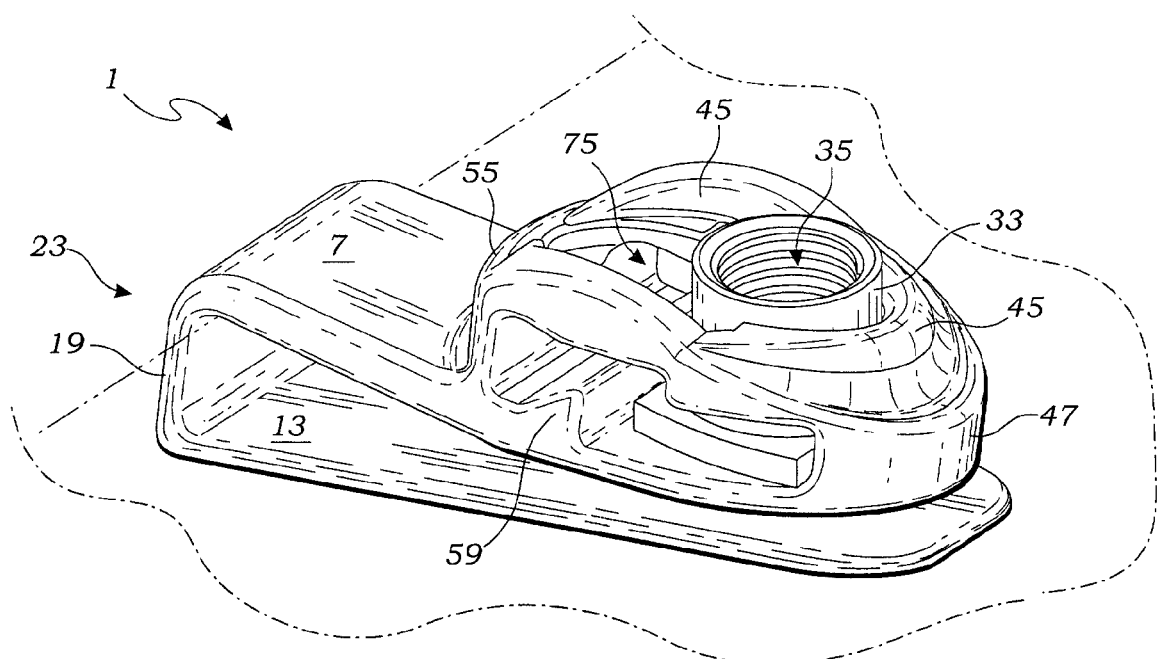
FIG. 4 is a perspective view of the clip nut of the present invention as affixed to a panel.

With reference to FIGS. 1-9, the clip nut 1 of the present invention includes a clip body 5 and a nut 31. The clip body includes an upper arm 7 and a lower arm 13 connected together by a connecting wall 19. The upper arm 7, lower arm 13 and connecting wall 19 form a generally "U" shaped structure having a closed proximal end 21 and an open distal end 23 wherein the upper and lower arms are spaced apart sufficient to accept a panel 97. As illustrated in FIG. 3, both the upper arm 7 and lower arm 13 have a hole (11 and 15, respectively) which are coaxially aligned and located near the clip body's distal extremity 23. Though not necessary, in a preferred embodiment the clip body's lower arm 13 includes one or more ears 17 which project upwardly around the lower arm's hole for projection and alignment into a hole formed within a panel 97.

As best illustrated in FIGS. 1 and 2, the clip nut 1 has a nut 31 having a tubular body 33 and a base 37. The tubular body 33 has a generally cylindrical exterior and a central threaded bore 35 sized and threaded for receipt of the male threads of a bolt or the like. The nut's base 37 projects outwardly from the nut's tubular body 33 so as to maintain a hole through the entire nut for passage of a male threaded fastener. In addition, the base 37 extends outwardly in the form of tabs 39 which are provided to prevent rotation of the nut 31 relative to the clip nut's body when assembled together. The nut's tabs 39 can take various forms. However, in a preferred embodiment, the tabs are simple flat lateral extensions which project outwardly from the nut's tubular body and have rounded ends.

To affix the nut 31 to the clip body 5, the clip nut has a nut housing 45. The nut housing has an end wall 47 which extends laterally and upwardly upon the distal end 23 of the clip body's upper arm 7. The end wall 47 may have a curved distal front 49. However, the end wall's interior face is preferably substantially planar and vertical. Preferably the end wall 51 is solid. However, the end wall may include holes or spaces to provide weight savings.

With reference primarily to FIGS. 5-8, the nut housing 45 further includes an intermediate wall 55. The intermediate wall projects upwardly and laterally at least partially across the clip nut's upper arm 7 between the clip body's proximal end 21 and distal end 23. The nut housing's intermediate wall 55 may take various shapes and forms to provide structural integrity.

Also extending laterally across the top surface of the clip body's upper arm, the nut housing 45 has a ridge 59. The ridge 59 is positioned between the intermediate wall 55 and end wall 47. The ridge 59 and end wall 47 are positioned so that the upper arm's hole 11 is spaced between the ridge and end wall. Furthermore, the ridge 59 has a vertical face 61 which is substantially parallel to the end wall's interior face 51. In addition, the ridge 59 has a top surface 63 which slopes proximally and downwardly from the ridge's vertical face 61 to merge with the top surface of the clip body's upper arm 7.

Figure 5:
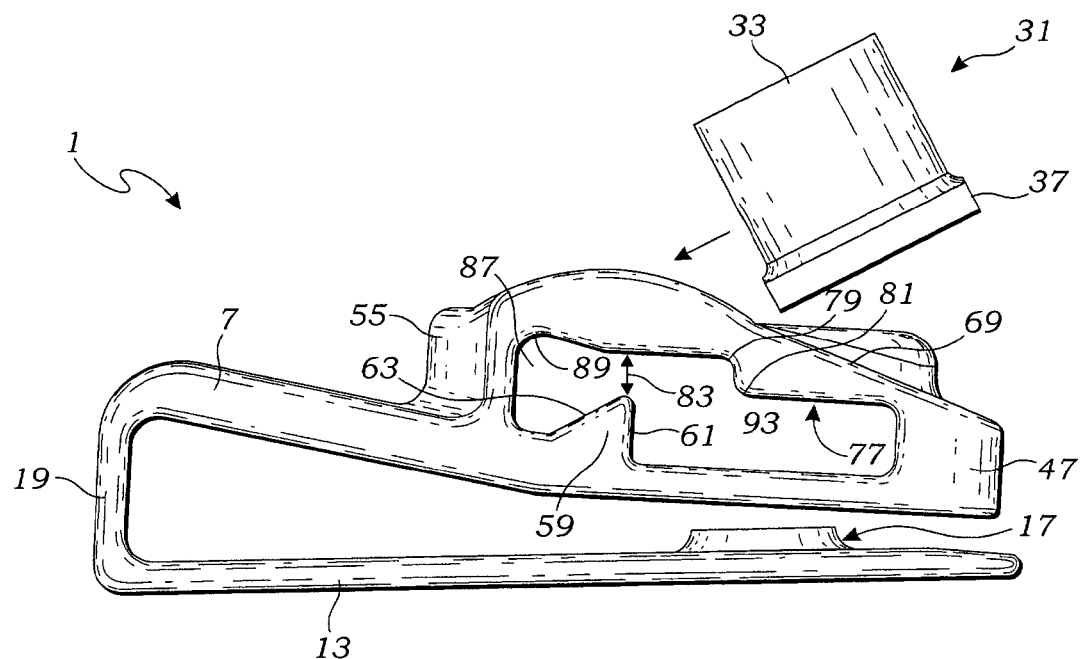
FIG. 5 is a side view of the clip nut of the present invention with the nut removed from the clip nut.

In addition to an end wall 47, an intermediate wall 55 and a ridge 59, the nut's housing includes a top wall 69. The top wall engages and extends proximally from the end wall 47 to engage the intermediate wall 55. Importantly, and as best seen in FIG. 5, the top wall 69 extends over the ridge 59 with sufficient space 83 so as to allow the nut's base 37 to slide over the top of the ridge. The top wall further includes an opening 71. The opening 71 is substantially "cross" shaped and includes a laterally extending slot 73 which is sized for receipt of the nut's base 37. The opening 71 further includes a longitudinally extending channel 75. The longitudinal channel 75 is oval shaped and sufficiently wide to accept the nut's tubular body 33, but sufficiently narrow to substantially restrict lateral movement of the tubular body 33. However, the channel 75 is sufficiently long to allow some longitudinal movement of the tubular body within the channel 75. As illustrated in FIGS. 5-8, the underside of the top wall 69 includes a planar retaining surface 77 which is parallel to the top surface of the underlying upper arm 7. The top wall's planar retaining surface 77 extends proximally from the end wall 47 to an edge 81 wherein the top wall extends upwardly and then proximally to form a recess 79.

With reference to FIGS. 5-9, the top wall 69, intermediate wall 55, lower arm 7 and end wall form a volume substantially separated into two distinct chambers by the ridge 59. Specifically, the top wall 69, intermediate wall 55 and sloped top surface 63 of the ridge 59 form a teardrop shaped cavity 87. As illustrated in FIG. 5, the teardrop shaped cavity 87 has an upper surface 89 that extends slightly upwardly in the proximal direction. In addition, the top wall 69, ridge's vertical face 61, upper arm 7 and end wall 47 form a nut receiving chamber 93 which is sized for receipt of the nut's base 37 when the nut 31 is properly installed within the clip nut 1.

Figure 6:
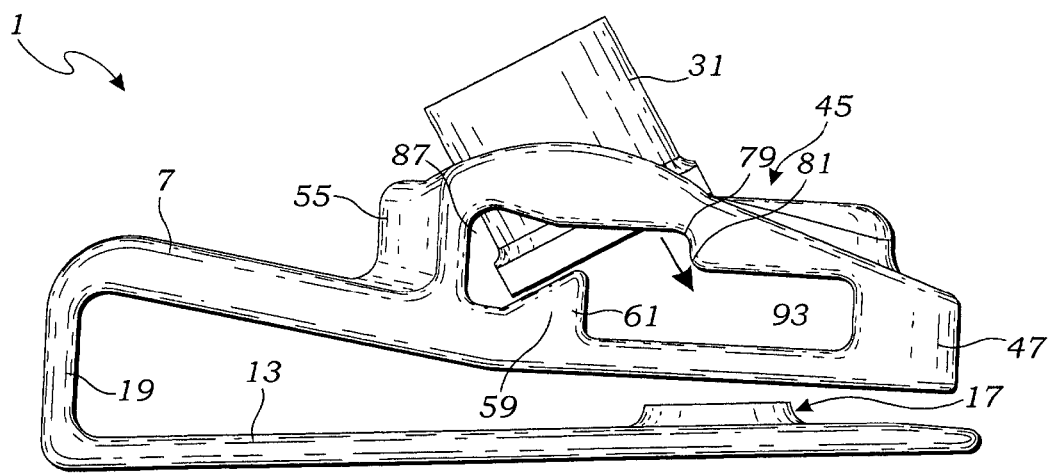
FIG. 6 is a side view of the clip nut of the present invention in the process of the nut being installed within the clip nut.
Figure 7:
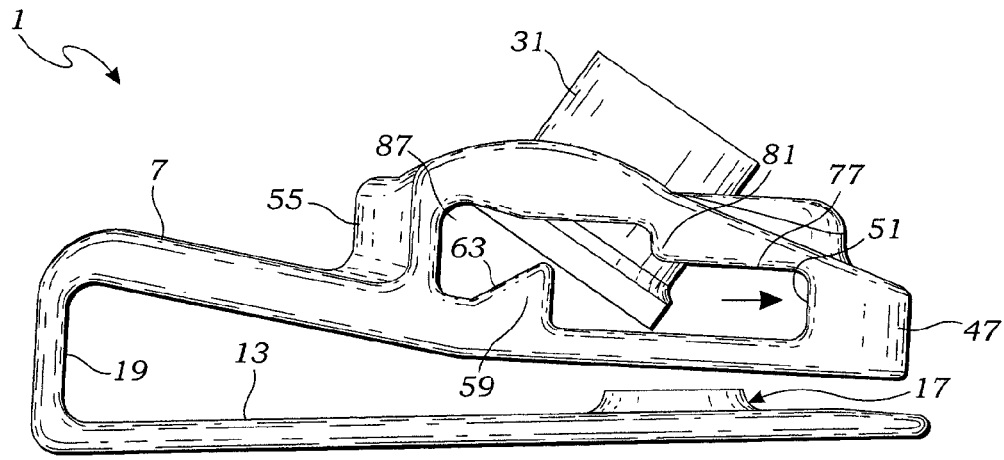
FIG. 7 is an additional side view of the clip nut of the present invention as the nut is being installed into the clip nut.
Figure 8:
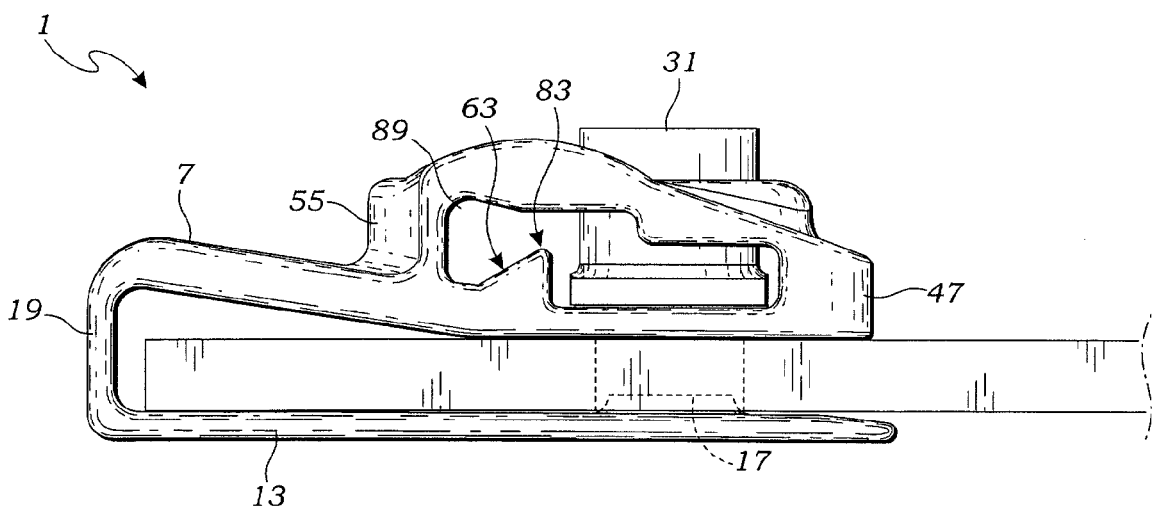
FIG. 8 is a side view of the clip nut of the present invention affixed to a panel.

As illustrated in FIGS. 5 and 6, the nut 31 is installed within the nut's housing 45 by sliding the nut's base 37 through the top wall's lateral slot 73. To this end, the nut's base is slid downwardly and proximally through the slot into the nut housing's teardrop shaped cavity 87. Once the nut's base 37 has entered the cavity 87 and engaged the intermediate wall 55, the nut 31 is tilted so that the top of the tubular body 33 is rotated distally causing the base's proximal edge to move upwardly and engage the cavity's upper surface 89 and causing the base's distal edge to move downwardly to below the top wall's retaining surface 77. As illustrated in FIGS. 7 and 8, the nut's base 37 is then moved into the nut receiving chamber 93 by sliding the nut's base 37 distally upon the ridge 59 until the nut's base is entirely positioned within the nut receiving chamber 93. This results in the nut's central bore 35 being coaxially aligned with the upper and lower arm holes 11 and 15 (See FIG. 3).

Preferably, the nut housing 45 is constructed such that a slight amount of deformation of the top wall 69 is required to move the nut's base into the nut receiving chamber 93 so as to impede removal of the nut from the nut housing. Once in place, the nut 31 is restrained from moving vertically upward from the upper arm by the top wall's planar retaining surface 77. Furthermore, the nut is restrained laterally by the nut's tubular body 33 being restrained within the top wall's longitudinal channel 75. Finally, longitudinal and rotational movement of the nut 31 is restrained by the ridge 59 and end wall 47.

Figure 9:
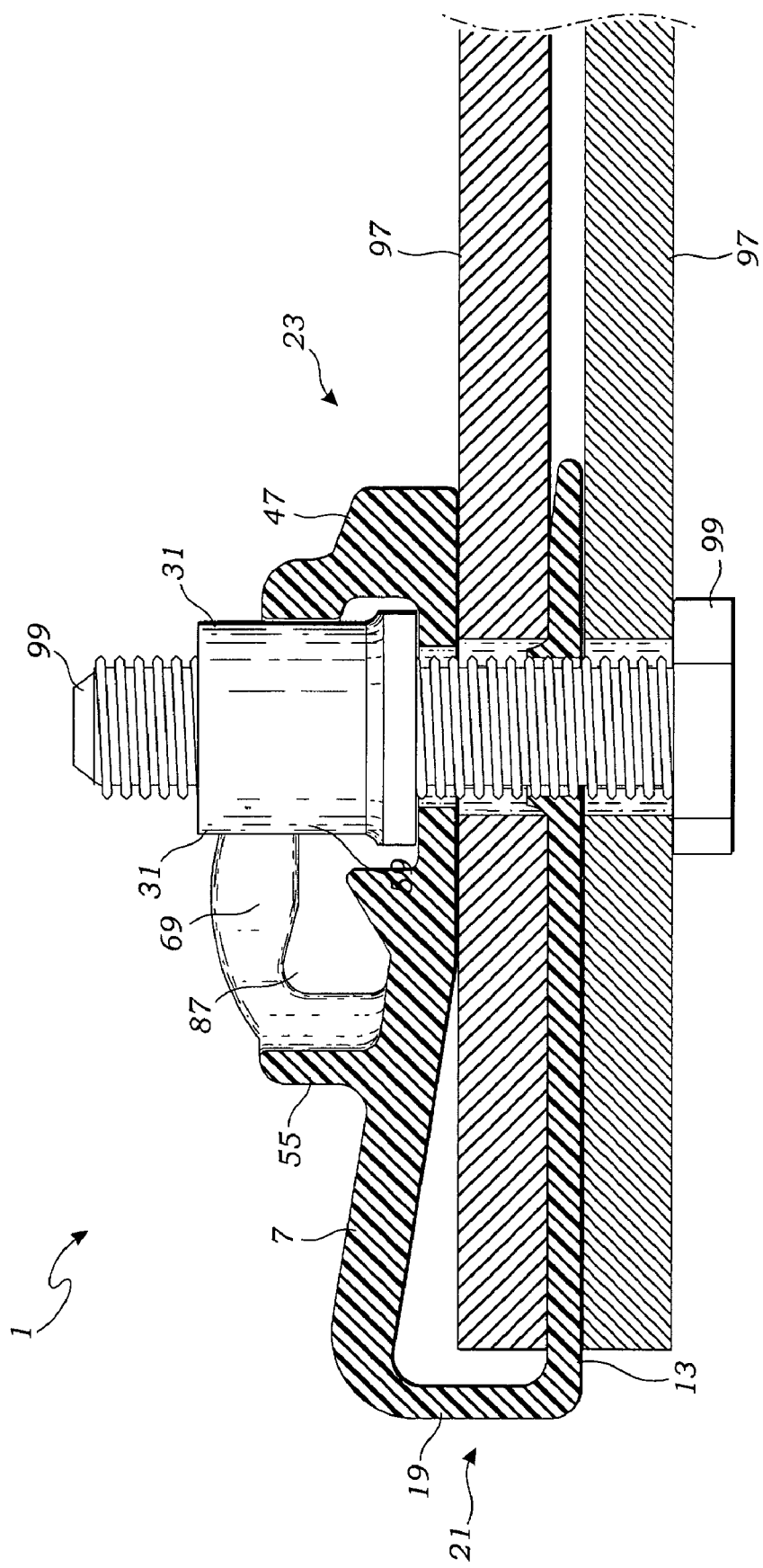
FIG. 9 is a side view of the clip nut of the present invention in use affixing two panels together utilizing a bolt.

The clip nut is useful for joining various items together. For example, as illustrated in FIG. 9, the clip nut 1 may be used to join two panels 97 together utilizing a threaded male fastener in the form of a bolt 99. Moreover, the clip nut 1 is exceptionally durable and withstands high loads and torque imparted to the nut. As would be understood by one skilled in the art, the only significant deformation of the clip body during installation of the nut is a deformation to the nut housing's top wall 69. Significant deformation of the ridge 59 and end wall 47 is not required. Thus, the structure elements preventing longitudinal and rotational movement of the nut member, namely the ridge and end wall, do not require deformation during the assembly process. This permits these structural elements to be more stiffly constructed to increase the clip nut's durability, load and torque capabilities.

Various changes of the clip nut may be made without departing from the spirit and scope of the invention. For example, it is preferred that the clip body be molded into one piece of plastic and that the nut be made of a metal. More preferably, the clip body is molded in one piece with polyetheretherketone (PEEK) and the nut is made of a titanium alloy. Since still additional changes can be made without departing from the spirit and scope of the invention, it is not intended that the invention be limited except by the following claims. Having described our invention in such terms so as to enable persons skilled in the art to understand the invention, recreate the invention and practice it, and having presently identified the presently preferred embodiments thereof,

We claim:

1. A clip nut comprising:
    a clip body including an upper arm having proximal and distal ends, a lower arm having proximal and distal ends, an end wall connecting the upper and lower arms at their proximal ends to form a closed proximal end for said clip body with the opposite distal end of said clip body being open, and a nut housing for securing a nut to said clip body, said upper and lower arms including coaxially aligned holes for receipt of a male fastener passing through the upper and lower arms of the clip body;
    a nut having a base and a tubular body extending upwardly said base, said tubular body having an internally threaded central bore for receipt of a male fastener, said base including a pair of tabs radially projecting from opposite sides of said tubular body;
    said nut housing formed upon said clip body's upper arm, said nut housing having an upwardly and laterally extending end wall at the upper arm's distal extremity, an upwardly and laterally extending intermediate wall located between said upper arm's proximal and distal extremities, and a laterally extending ridge between said end wall and said intermediate wall, said ridge including a substantially vertical face facing and parallel to said end wall and a top surface which slopes downward and proximally from the top of said face to engage said upper arm, said nut housing further including a top wall engaging and extending from said end wall to said intermediate wall with a vertical space between said top wall and said ridge sufficient to allow said nut's base to slide within said space over said ridge, said top wall including an opening having a laterally extending slot sized to slidably receive said nut base and an oval longitudinally extending channel sized to receive said nut's tubular body;
    wherein said volume between said intermediate wall, said top wall and said ridge's sloped top surface form a cavity having a tear dropped shaped cross-section, and said volume between said ridge's face, said end wall, said upper arm and said top wall form a nut receiving chamber with said upper arm's aligned hole between said end wall and said ridge's face; and
    wherein said nut can be installed within said nut housing by sliding said nut's base downwardly and proximally through said opening's slot so that said nut's base slides upon said ridge's top surface into said tear dropped shaped cavity while said nut's tubular body enters said opening's oval channel, and thereafter tilting said nut's base upon said ridge wherein said nut's tubular body moves distally, and thereafter sliding said nut's base into said nut receiving chamber until said nut's tubular body is coaxially aligned with said upper arm and lower arm holes.

2. A clip nut of claim 1 wherein said clip body and nut housing are molded in one piece of plastic and said nut is made of metal.

3. A clip nut of claim 1 wherein said clip body is molded in one piece of polyetheretherketone (PEEK) and said nut is made of a titanium alloy.

4. A clip nut of claim 1 further comprising a pair of alignment ears projecting up from around said lower arm's hole for projection towards and alignment with said upper arm's hole.

\* \* \* \* \*